US007551999B2

(12) United States Patent
Uraki

(10) Patent No.: US 7,551,999 B2
(45) Date of Patent: Jun. 23, 2009

(54) VEHICLE-MOUNTED COMMUNICATION SYSTEM AND CONNECTOR DEVICE WITH COMMUNICATION-CONTROLLING CAPABILITY

(75) Inventor: Takeshi Uraki, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 245 days.

(21) Appl. No.: 11/632,045

(22) PCT Filed: Jul. 13, 2005

(86) PCT No.: PCT/JP2005/012924

§ 371 (c)(1),
(2), (4) Date: Jan. 10, 2007

(87) PCT Pub. No.: WO2006/006626

PCT Pub. Date: Jan. 19, 2006

(65) Prior Publication Data

US 2008/0071447 A1 Mar. 20, 2008

(30) Foreign Application Priority Data

Jul. 14, 2004 (JP) .............................. 2004-207006

(51) Int. Cl.
*G06F 7/00* (2006.01)
*B60R 22/00* (2006.01)
(52) U.S. Cl. ............................ 701/48; 701/24; 701/36; 340/439; 342/357.1

(58) Field of Classification Search .................. 701/24, 701/29, 35–36, 48; 340/425.5, 438, 439, 340/539.1, 999; 455/420; 342/357.1, 357.13
See application file for complete search history.

(56) References Cited

U.S. PATENT DOCUMENTS

| 6,127,947 | A  | * | 10/2000 | Uchida et al. ................ 340/999 |
| 6,343,249 | B1 |   | 1/2002  | Sakai et al. |
| 6,430,716 | B1 |   | 8/2002  | Hiramatsu |
| 7,103,460 | B1 | * | 9/2006  | Breed ............................ 701/29 |
| 2003/0009271 | A1 | * | 1/2003 | Akiyama ....................... 701/33 |

FOREIGN PATENT DOCUMENTS

| JP | U 59-63981 | 4/1984 |
| JP | A 3-71581  | 3/1991 |
| JP | A 6-30478  | 2/1994 |

(Continued)

*Primary Examiner*—Gertrude Arthur Jeanglaud
(74) *Attorney, Agent, or Firm*—Oliff & Berridge, PLC

(57) ABSTRACT

An object of the present invention is to provide flexibility in modifying or updating a communication system and the like of a vehicle-mounted network, thus reducing processing loads on electrical components modules and the like. In the present invention, a connector device with communication-controlling capability takes charge of controlling a communication system of a vehicle-mounted network, so that an electrical components module is specialized for its inherent processing other than the communication system. A control program about the communication system is rewritably stored in a rewritable non-volatile storage device in the connector device with communication-controlling capability, and the communication system is modified or updated only by renewing the control program stored in the non-volatile storage device in the connector device with communication-controlling capability.

6 Claims, 4 Drawing Sheets

FOREIGN PATENT DOCUMENTS

| | | |
|---|---|---|
| JP | A 7-183851 | 7/1995 |
| JP | A 8-79841 | 3/1996 |
| JP | A 10-22006 | 1/1998 |
| JP | A 10-47151 | 2/1998 |
| JP | A 10-164179 | 6/1998 |
| JP | A 11-337564 | 12/1999 |
| JP | A 2000-207194 | 7/2000 |
| JP | A 2000-253561 | 9/2000 |
| JP | A 2000-257501 | 9/2000 |
| JP | A 2002-44742 | 2/2002 |
| JP | A 2004-268630 | 9/2004 |
| JP | A 2004-273683 | 9/2004 |

* cited by examiner

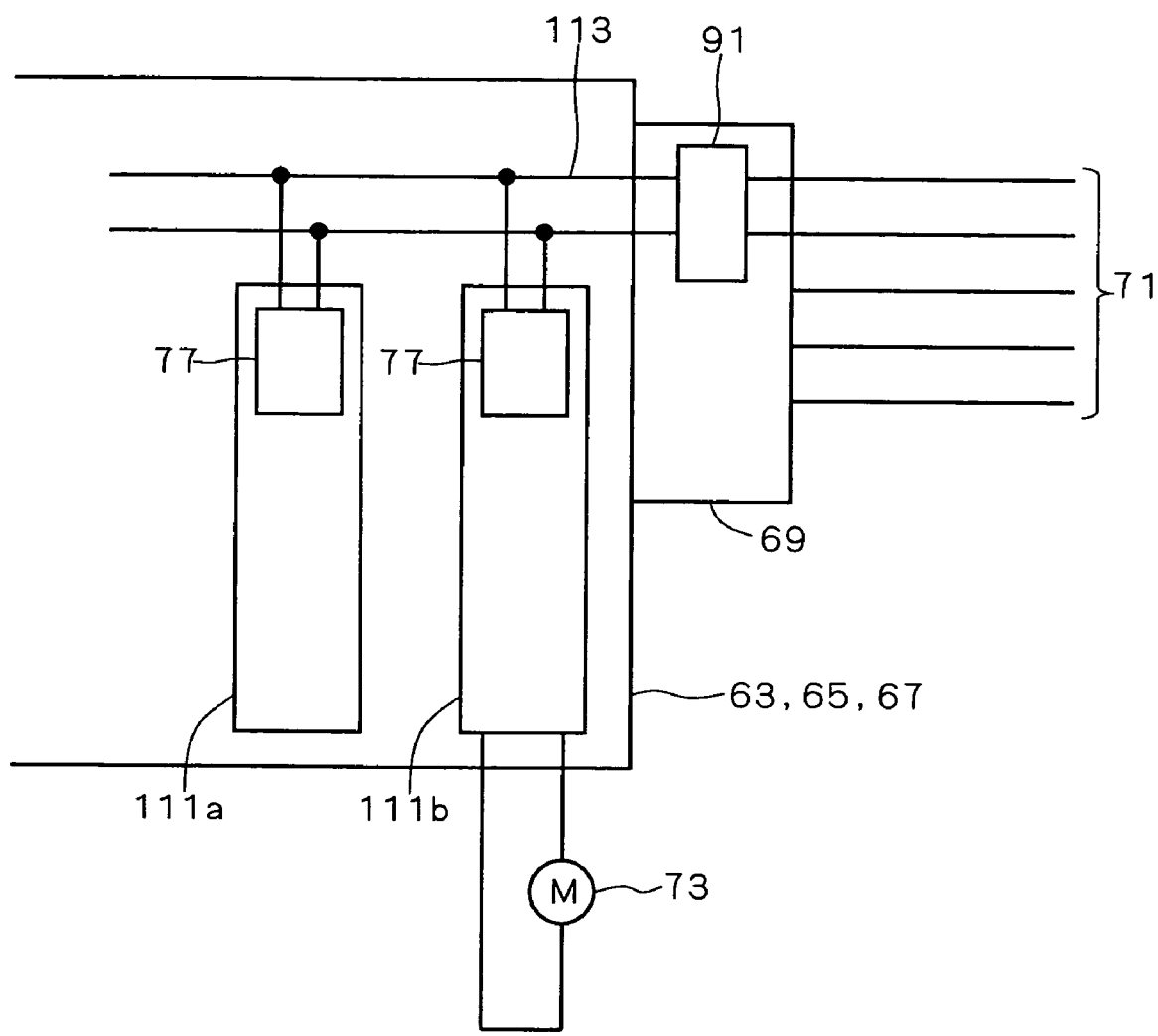
F I G . 3

F I G . 5
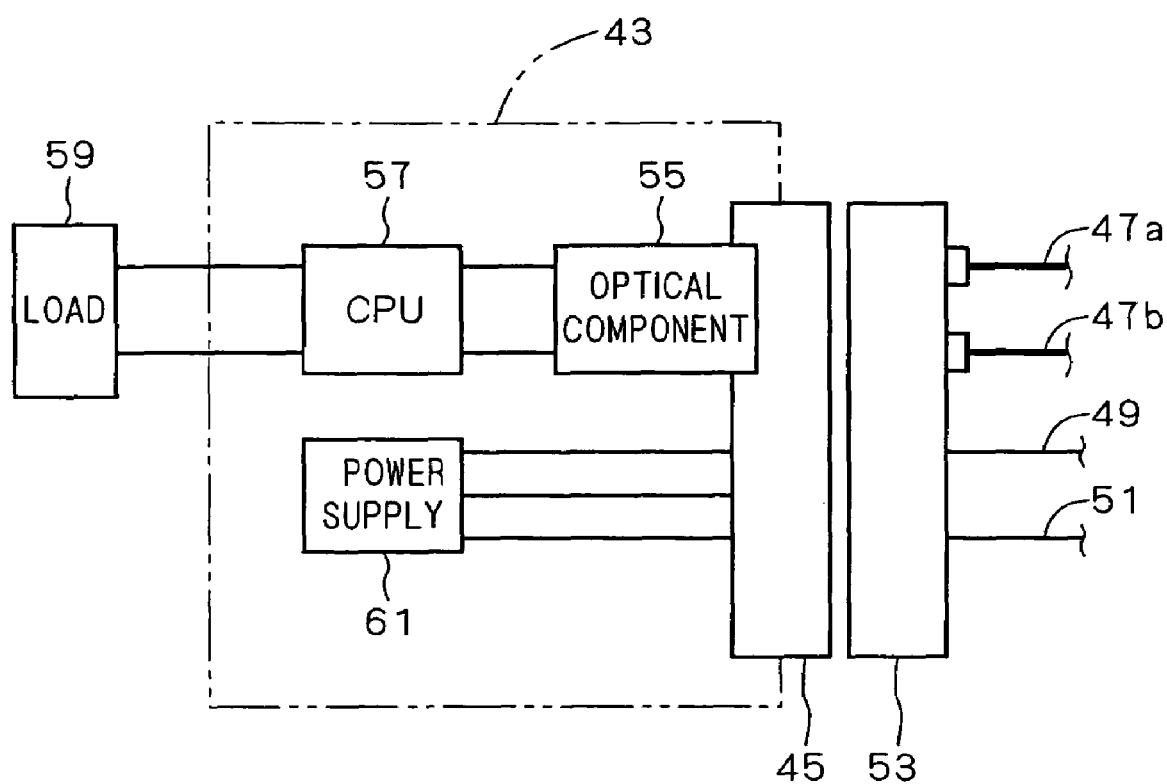

VEHICLE-MOUNTED COMMUNICATION SYSTEM AND CONNECTOR DEVICE WITH COMMUNICATION-CONTROLLING CAPABILITY

TECHNICAL FIELD

The present invention relates to a vehicle-mounted communication system that carries out communications among a plurality of electrical components units, and a connector device with communication-controlling capability.

BACKGROUND ART

Automotive electrical components units have been increasing steadily with recent developments in electronic communications technology, and to control an increase in the number of wires, multiplex communications are beginning to be carried out by organizing a network in an automobile. With such trend, electrical components units connected to a vehicle-mounted network have been modularized.

As electrical components units of an automobile, an engine module 1, a rear seat module 3, door modules 5a to 5d, a driver's seat (D-seat) module 7, an instrument panel module 9, a passenger seat (P-seat) module 11, and a roof module 13 and the like are mounted, as shown in FIG. 4 by way of example. These electrical components units 1, 3, 5a to 5d, 7, 9, 11 and 13 are connected through various kinds of communication paths such as optical cables, i.e., a trunk line 15, a control-system communication line 17, and a car-body-system communication line 19 and the like, to organize a vehicle-mounted network.

When a vehicle-mounted network is organized by modularizing electrical components units in an automobile in this manner, an electrical components unit 43 connects a connector 45 on the electrical components unit 43 side optically and electrically to a connector 53 which is connected to optical cables 47a and 47b, a feeder line 49, and a ground line 51, as shown in FIG. 5 by way of example, and performs input and output of the optical cables 47a and 47b using a prescribed optical component 55. A signal inputted and outputted by the optical component 55 is processed by a CPU 57 to thereby drive various loads 59. A reference numeral 61 in FIG. 5 represents a power supply circuit.

Communications among the electrical components units 1, 3, 5a to 5d, 7, 9, 11, 13 and 43 through such vehicle-mounted network are managed by the electrical components units 1, 3, 5a to 5d, 7, 9, 11, 13 and 43 themselves, or a centralized management unit (not shown) provided separately from the electrical components units. This allows the organization of a very efficient communication system as long as a protocol and the like are fixed in multiple communications.

With customers' diverse needs for automobiles, the electrical components units 1, 3, 5a to 5d, 7, 9, 11, 13 and 43 connected to the vehicle-mounted network need to be modified or updated individually, for automobiles as products to conform to each user's needs.

Also, to improve communication speed and the quality of communications in rapidly advancing communications technology, it is desirable that a communication system itself of a communication protocol applied to the vehicle-mounted network, such as a physical layer or a data link layer of the communication protocol, be modified or updated.

When the electrical components units 1, 3, 5a to 5d, 7, 9, 11, 13 and 43 connected to the vehicle-mounted network, and the communication system and the like are modified or updated as described above, with the vehicle-mounted network communications being managed by the electrical components units 1, 3, 5a to 5d, 7, 9, 11, 13 and 43 themselves or the separately provided centralized management unit, it is necessary that programs applied to these units be modified or updated as well with each modification or update to the electrical components units 1, 3, 5a to 5d, 7, 9, 11, 13 and 43 mounted on an automobile and the communication system (a physical layer or a data link layer of the communication protocol) in the vehicle-mounted network.

However, as there are numerous combinations of the electrical components units 1, 3, 5a to 5d, 7, 9, 11, 13 and 43 of an automobile depending on the user's taste for a car model, a car rank, and options on the car, an increase in the types of the electrical components units 1, 3, 5a to 5d, 7, 9, 11, 13 and 43 mounted on an automobile involves an increase in management items for the units. Further, because the electrical components units 1, 3, 5a to 5d, 7, 9, 11, 13 and 43 are modified or updated individually, modifications or updates to management programs and the like for the units increase in complexity.

In addition, if the management of the electrical components units 1, 3, 5a to 5d, 7, 9, 11, 13 and 43, as well as the management of the communication system that is modified or updated separately from the electrical components units 1, 3, 5a to 5d, 7, 9, 11, 13 and 43 are done by the electrical components units 1, 3, 5a to 5d, 7, 9, 11, 13 and 43 themselves or the separately provided centralized management unit, it is necessary to frequently modify or update both the management programs for the numerous electrical components units 1, 3, 5a to 5d, 7, 9, 11, 13 and 43, and the management program for the communication system, which is inefficient.

The management of the electrical components units 1, 3, 5a to 5d, 7, 9, 11, 13 and 43 and the management of the communication system by the electrical components units 1, 3, 5a to 5d, 7, 9, 11, 13 and 43 themselves or the separately provided centralized management unit will further cause the expansion of loads on CPUs in those units, setting limitations on the units' processing abilities.

DISCLOSURE OF INVENTION

Therefore, an object of the present invention is to provide a vehicle-mounted communication system and a connector device with communication-controlling capability capable of giving flexibility in modifying or updating a communication system and the like of a communication system, and further reducing processing loads on electrical components units and the like.

To solve the above-mentioned problems, in a first aspect of the present invention, a vehicle-mounted communication system that carries out communications among a plurality of electrical components units in an automobile through a prescribed vehicle-mounted network includes: the plurality of electrical components units; and a plurality of connector devices with communication-controlling capability removably connected to the electrical components units, respectively, and connected to the vehicle-mounted network, the connector devices taking charge of controlling a communication system through the vehicle-mounted network.

A second aspect of the present invention is directed to the vehicle-mounted communication system according to the first aspect, wherein each of the connector devices with communication-controlling capability includes a communication processing part taking charge of controlling a communication system through the vehicle-mounted network, and a rewritable non-volatile storage device storing a control program that stipulates control in the communication processing part.

A third aspect of the present invention is directed to the vehicle-mounted communication system according to the second aspect, wherein each of the connector devices with communication-controlling capability is capable of being connected to a prescribed exclusive program rewrite device, each of the connector devices with communication-controlling capability including, when supplied with a control program of a new communication system from the program rewrite device, a capability of rewriting the control program stored in the non-volatile storage device in the connector device with communication-controlling capability to the control program of the new communication system, and transmitting the control program of the new communication system to the other connector devices with communication-controlling capability through the vehicle-mounted network.

In a fourth aspect of the present invention, a connector device with communication-controlling capability that connects an electrical components unit in an automobile removably to a prescribed vehicle-mounted network takes charge of controlling a communication system through the vehicle-mounted network.

A fifth aspect of the present invention is directed to the connector device with communication-controlling capability according to the fourth aspect, including: a communication processing part taking charge of controlling a communication system through the vehicle-mounted network; and a rewritable non-volatile storage device storing a control program that stipulates control in the communication processing part.

A sixth aspect of the present invention is directed to the connector device with communication-controlling capability according to the fifth aspect, being capable of being connected to a prescribed exclusive program rewrite device, the connector device with communication-controlling capability including, when supplied with a control program of a new communication system from the program rewrite device, a capability of rewriting the control program stored in the non-volatile storage device in the connector device with communication-controlling capability to the control program of the new communication system, and transmitting the control program of the new communication system to the other connector devices with communication-controlling capability through the vehicle-mounted network, and a capability of rewriting the control program stored in the non-volatile storage device to the control program of the new communication system supplied from the other connector devices with communication-controlling capability through the vehicle-mounted network.

According to the first and fourth aspects of the present invention, the processing ability of the connector device with communication-controlling capability can be specialized for communication processing while the processing ability of the electrical components unit can be specialized for its inherent processing in the electrical components unit. This provides full use of performance of both of the electrical components unit and the connector device with communication-controlling capability, which allows processing speed of the electrical components unit and communication speed to be increased easily.

According to the second and fifth aspects of the present invention, a communication system can be modified or updated only by renewing the control program stored in the non-volatile storage device in the connector device with communication-controlling capability, which requires no program modification or update at all in the electrical components unit. This allows a communication system to be modified or updated easily, attaining the latest communication system modified by a simple operation.

According to the third and sixth aspects of the present invention, when the vehicle-mounted network is already provided in an automobile, for example, all that is required to do is connect only one of the plurality of connector devices with communication-controlling capability connected to the vehicle-mounted network that is placed in the easiest position to be connected to the program rewrite device to the program rewrite device, and input the new program and the like. As a result, the communication system can be modified or updated easily in the connector devices with communication-controlling capability provided in various positions in the automobile.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a block diagram illustrating another example of the vehicle-mounted communication system.

FIG. 5 is a block diagram illustrating part of a conventional vehicle-mounted communication system.

BEST MODE FOR CARRYING OUT THE INVENTION

<Structure>

Figure 1:
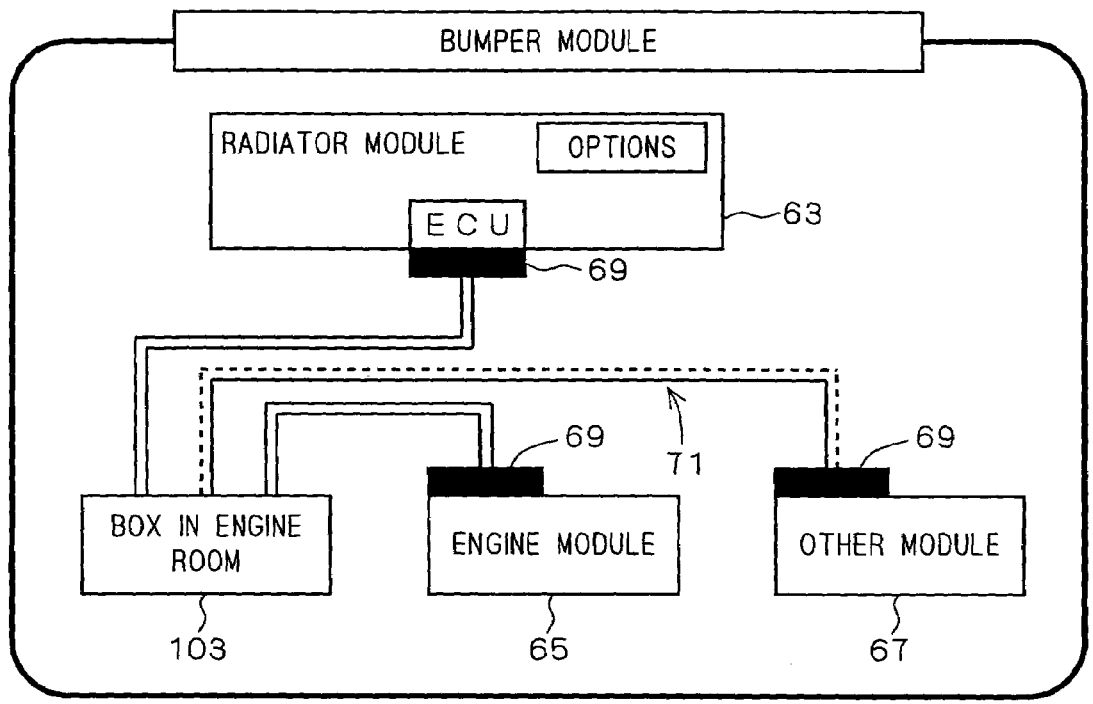
FIG. 1 is a block diagram illustrating a vehicle-mounted communication system according to a preferred embodiment of the present invention.
Figure 2:
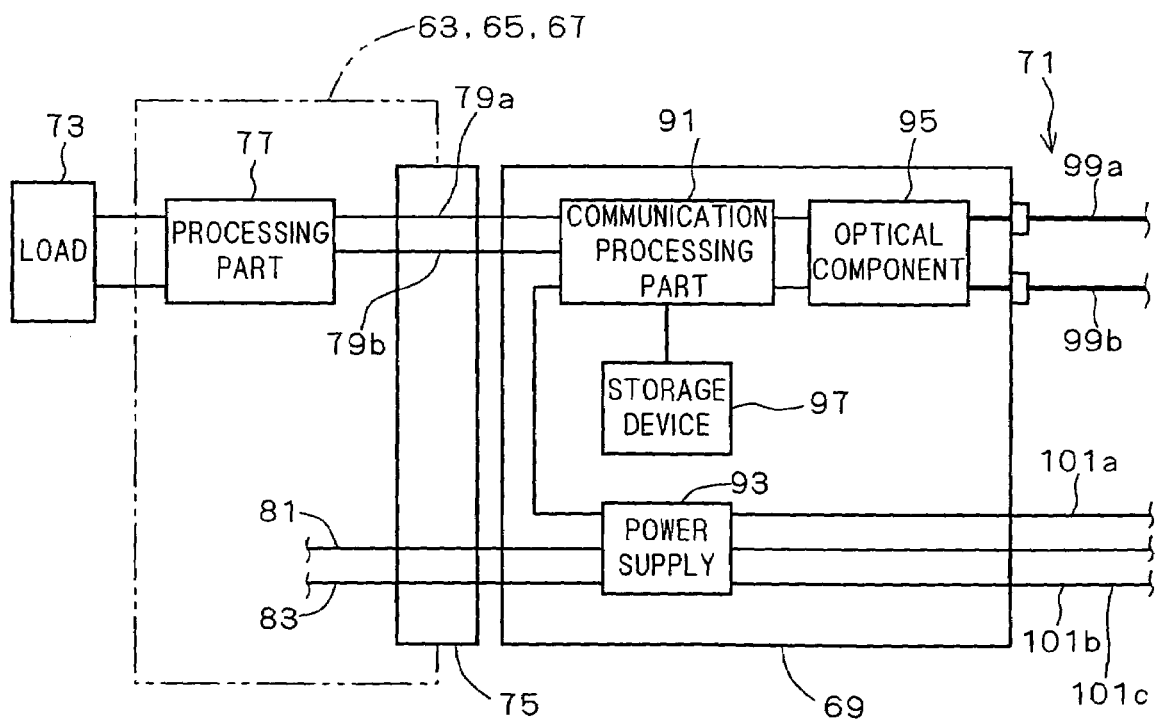
FIG. 2 is a block diagram illustrating part of the vehicle-mounted communication system according to the preferred embodiment of the present invention.
Figure 4:
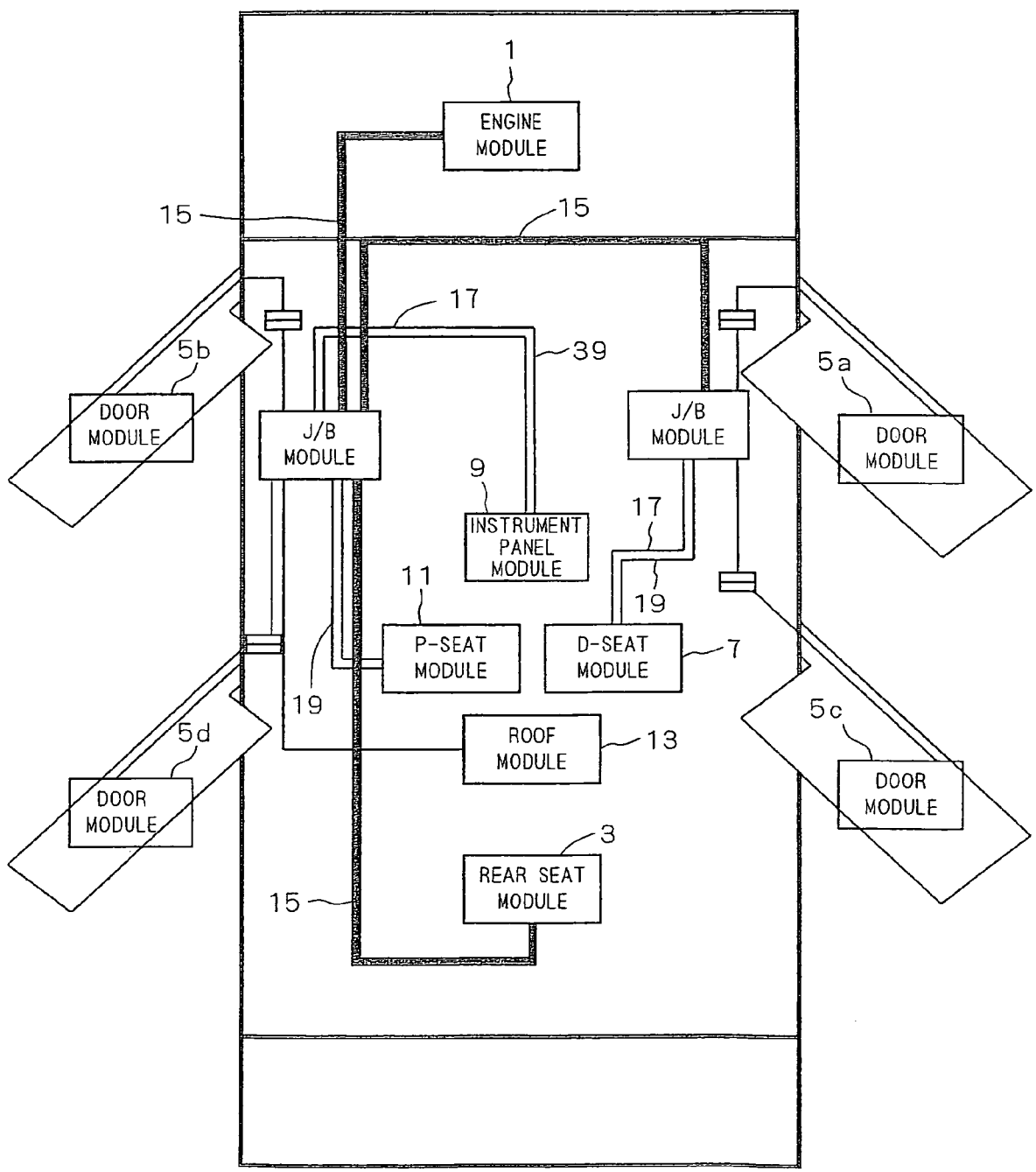
FIG. 4 is a block diagram illustrating a typical vehicle-mounted communication system.

FIG. 1 is a block diagram illustrating a vehicle-mounted communication system according to a preferred embodiment of the present invention, and FIG. 2 is a block diagram illustrating part of the vehicle-mounted communication system.

As depicted in FIG. 1, the vehicle-mounted communication system is structured to carry out communications among a plurality of electrical components units 63, 65 and 67 in an automobile through a prescribed vehicle-mounted network 71, and includes the plurality of electrical components modules 63, 65 and 67, and connector devices 69 with communication-controlling capability connected to the electrical components modules 63, 65 and 67, respectively.

As depicted in FIG. 1, the electrical components modules 63, 65 and 67 are a radiator module 63, an engine module 65 and some other module 67, for example. As depicted in FIG. 2, each of the electrical components modules 63, 65 and 67 is removably connected to the connector device 69 with communication-controlling capability through a prescribed connecting connector 75, drives a prescribed load 73, and communicates with the other electrical components modules 63, 65 and 67 through the connector device 69 with communication-controlling capability and the vehicle-mounted network 71.

Each of the electrical components modules 63, 65 and 67 includes a processing part 77 such as a CPU as a control capability component, and communicates with the other electrical components modules 63, 65 and 67 through the processing part 77 while performing drive control of the load 73 based on a control instruction signal and the like received through such communications. The processing part 77 in the electrical components modules 63, 65 and 67 also performs, in accordance with a previously stored program in a prescribed storage device which is not shown, communication control of a network layer, a transport layer, a session layer, a presentation layer and an application layer of a communication protocol used for the communications carried out through the vehicle-mounted network 71.

Electric signals are given and received and electricity is supplied between the connecting connector 75 of the electrical components modules 63, 65 and 67 and the connector device 69 with communication-controlling capability. Reference numerals 79a and 79b in FIG. 2 represent control-system electric signal paths, a reference numeral 81 represents a feeder line, and a reference numeral 83 represents a ground line, respectively.

The connector device 69 with communication-controlling capability is capable of being removably connected to each of the electrical components modules 63, 65 and 67, and includes the capability of carrying out general-purpose high-speed serial communications with the electrical components modules 63, 65 and 67 while defining a physical layer of the communication protocol in the vehicle-mounted network 71, and further controlling a data link layer of the communication protocol. As shown in FIG. 2, the connector device 69 includes a communication processing part 91 such as a CPU, a power supply circuit 93, an optical component 95 forming an optical communication interface, and a prescribed rewritable non-volatile storage device 97 such as a flash ROM.

The communication processing part 91 operates in accordance with a procedure stipulated by a previously stored control program in the non-volatile storage device 97, and includes the capability of communicating with the other electrical components modules 63, 65 and 67 through the optical component 95 and the vehicle-mounted network 71 while performing, based on a control signal and the like supplied through the communications, on/off control of the power supply circuit 93 and performing power supply control of the electrical components modules 63, 65 and 67 directly connected to the connector device 69 with communication-controlling capability.

Upon receipt of an instruction signal (rewrite instruction signal) instructing to modify or update the control program, and a control program of a new communication system to be rewritten through the optical component 95 and the vehicle-mounted network 71, the communication processing part 91 also includes the capability of modifying or updating the control program stored in the non-volatile storage device 97 to the control program of the new communication system.

In addition, the connector device 69 with communication-controlling capability is capable of being connected to a prescribed exclusive program-rewritable device (not shown) instead of the electrical components modules 63, 65 and 67. Upon receipt of a rewrite instruction signal and a control program of a new communication system from this program-rewritable device when connected thereto, the connector device 69 with communication-controlling capability includes the capability of modifying or updating the control program stored in the non-volatile storage device 97 to the control program of the new communication system, while simultaneously transmitting (broadcasting) the rewrite instruction signal and the control program of the new communication system to all the other connector devices 69 with communication-controlling capability connected to the vehicle-mounted network 71 through the optical component 95 and the vehicle-mounted network 71.

The power supply circuit 93 is connected to a feeder line 101a, a ground line 101b, and a power-supply-control-signal transmission electric line 101c. The power supply circuit 93 itself performs on/off control of the power supplies of the electrical components modules 63, 65 and 67 based on a power-supply-control-signal supplied from the power-supply-control-signal transmission line 101c, and performs on/off control of the power supplies of the electrical components modules 63, 65 and 67 based on a signal supplied from the communication processing part 91 as well.

The optical component 95 is an optical coupling device including a light-emitting device and a light-receiving device, which is an optical interface component that converts an electric signal between itself and the communication processing part 91, and an optical signal between itself and optical cables 99a and 99b of the vehicle-mounted network 71.

A reference numeral 103 in FIG. 1 represents a junction box that relays communications of the vehicle-mounted network 71 in an engine room.

<Communication Operation of Vehicle-Mounted Communication System>

In the vehicle-mounted communication system of the above-described structure, the electrical components modules 63, 65 and 67 concentrate only on managing the electrical components modules 63, 65 and 67 themselves, while a communication system (a physical layer or a date link layer of a communication protocol) which has conventionally been managed by these units is managed by the connector device 69 with communication-controlling capability side.

More specifically, when some kind of transmission signal is transmitted from one of the electrical components modules 63, 65 and 67 (transmission source) to the other electrical components modules 63, 65 and 67 (transmission destinations), communication control is performed on a network layer, a transport layer, a session layer, a presentation layer and an application layer of a communication protocol for the transmission signal in the one of the electrical components modules 63, 65 and 67. The transmission signal is then inputted to the connector device 69 with communication-controlling capability directly connected to the transmission source electrical components module 63, 65 or 67.

In the connector device 69 with communication-controlling capability having been supplied with the transmission signal, a data link layer is adjusted by the communication processing part 91, and the transmission signal is converted to an optical signal by the optical component 95 and then transmitted to the other connector devices 69 with communication-controlling capability through the optical cables 99a and 99b.

The converted optical signal includes information such as transmission destination addresses. Thus the transmission destination connector devices 69 with communication-controlling capability convert the optical signal to an electric signal by the optical component 95, perform a receiving process by the communication processing part 91 in the transmission destinations, and perform power supply control of the electrical components modules 63, 65 and 67 by the power supply circuit 93, while transferring the transmission signal to the electrical components modules 63, 65 and 67.

The transmission destination electrical components modules 63, 65 and 67 having received the transmission signal perform a prescribed process such as drive control of the load 73 based on the information included in the transmission signal.

In the course of the above operation, the connector device 69 with communication-controlling capability takes charge of adjusting the physical layer and data link layer of the communication protocol, so that the processing part 77 of the electrical components modules 63, 65 and 67 operates with concentration upon its original functions such as drive control of the load 73. Accordingly, a processing load on the processing part 77 of the electrical components modules 63, 65 and 67 can be reduced compared with a conventional processing part performing both drive control of the load 73 and communication control, thereby attaining efficient processing. Particularly, demand for improved processing efficiency of the processing part 77 of the electrical components modules 63, 65 and 67 increases with advancement of drive control of the load 73 by the electrical components modules 63, 65 and 67. Thus, the functions of the electrical components modules 63, 65 and 67 can be further improved by separating the processing into the electrical components modules 63, 65 and 67 and the connector device 69 with communication-controlling capability.

In addition, the processing ability of the communication processing part 91 on the connector device 69 with communication-controlling capability side can be specialized for communication processing.

This provides full use of performance of both of the processing parts 77 and 91 of the electrical components modules 63, 65 and 67 and the connector device 69 with communication-controlling capability, respectively, which allows processing speed of drive control of the load 73 and communication speed to be increased easily.

<Modification or Update Operation to Vehicle-Mounted Communication System>

First, when modifying or updating a communication system, all that is required to do is modify or update a control program stored in the non-volatile storage device 97 in the connector device 69 with communication-controlling capability.

More specifically, an operator selects only one of the plurality of connector devices 69 with communication-controlling capability connected to the vehicle-mounted network 71, and connects the selected connector device 69 with communication-controlling capability to the exclusive program rewrite device which is not shown.

The program rewrite device is then activated to input a rewrite instruction signal and a control program of a new communication system from the program rewrite device to the selected connector device 69 with communication-controlling capability.

Subsequently, the communication processing part 91 in the selected connector device 69 with communication-controlling capability modifies or updates a control program stored in the non-volatile storage device 97 to the control program of the new communication system.

Along with this operation, the communication processing part 91 in the selected connector device 69 with communication-controlling capability simultaneously transmits (broadcasts) the rewrite instruction signal and the control program of the new communication system to all the other connector devices 69 with communication-controlling capability connected to the vehicle-mounted network 71 through the optical component 95 and the vehicle-mounted network 71.

Then, in each of the other connector devices 69 with communication-controlling capability, the communication processing part 91 stores the supplied control program of the new communication system in the non-volatile storage device 97 for renewal, based on the rewrite instruction signal supplied from the vehicle-mounted network 71.

In such ways, the control programs of all connector devices 69 with communication-controlling capability connected to the vehicle-mounted network 71 can be modified or updated all at once.

Alternatively, the control program of the new communication system may be stored in the non-volatile storage device 97 only when necessary in each of the connector devices 69 with communication-controlling capability.

Still alternatively, instead of the broadcast transmission from the transmission source connector device 69 with communication-controlling capability to the transmission destination connector devices 69 with communication-controlling capability as described above, the control program of the new communication system may be downloaded by the other connector devices 69 with communication-controlling capability side while one transmission source connector device 69 with communication-controlling capability is connected to the exclusive program rewrite device. In this case, the other connector devices 69 with communication-controlling capability broadcast a transmission request signal for the control program of the new communication system to the vehicle-mounted network 71, and upon detection of the transmission request signal on the vehicle-mounted network 71 by the transmission source connector device 69 with communication-controlling capability, the control program of the new communication system is transmitted in response to the transmission request signal. As a result, modification or update to the control program of the new communication system can be performed in arbitrary connector devices 69 with communication-controlling capability.

With this method, when the vehicle-mounted network 71 is already provided in an automobile, for example, all that is required to do is connect only one of the plurality of connector devices 69 with communication-controlling capability connected to the vehicle-mounted network 71 that is placed in the easiest position to be connected to the program rewrite device, e.g. in a trunk room of the automobile, to the program rewrite device, and input the new program and the like. As a result, the communication system can be modified or updated in the connector devices 69 with communication-controlling capability provided in various positions in the automobile.

Also in this case, no program modification or update is required at all in the electrical components modules 63, 65 and 67 connected to the load 73. This allows a communication system to be modified or updated easily, attaining the latest communication system modified by a simple operation.

Further, programs of the electrical components modules 63, 65 and 67 themselves may be modified or updated by respective methods inherent in the electrical components modules 63, 65 and 67 themselves. In this case, as long as a procedure of a newly applied program to the electrical components modules 63, 65 and 67 conforms to a communication system applied to the connector device 69 with communication-controlling capability, no program modification or update is required in the connector device 69 with communication-controlling capability and the other electrical components modules 63, 65 and 67. This allows the programs of the electrical components modules 63, 65 and 67 to be modified or updated easily.

Therefore, an area influenced by program modifications or updates can be extremely narrowed in both the electrical components modules 63, 65 and 67 and the connector devices 69 with communication-controlling capability, which provides convenience.

Although the optical cables 99a and 99b are used for the vehicle-mounted network 71 by way of example in the above preferred embodiment, electric lines for transmitting electric signals and the like may be used instead.

Further, although the electrical components modules 63, 65 and 67 include the single processing part 77 such as a CPU by way of example in the above preferred embodiment, the electrical components modules 63, 65 and 67 may alternatively include a plurality of electronic units 111a and 111b as depicted in FIG. 3, the electronic units 111a and 111b each including the processing part 77 such as a CPU, and both of the processing parts 77 of the electronic units 111a and 111b being connected to the connector device 69 with communication-controlling capability through an in-module wire 113. In this case, the connector device 69 with communication-controlling capability may transmit information received from the vehicle-mounted network (wire harness) 71 to the respective processing parts 77 of the plurality of electronic units 111a and 111b in the electrical components modules 63, 65 and 67. The same effects as the above preferred embodiment can be obtained in this example illustrated in FIG. 3.

While the invention has been shown and described in detail, the foregoing description is in all aspects illustrative and not restrictive. It is therefore understood that numerous modifications and variations can be devised without departing from the scope of the invention.

The invention claimed is:

1. A vehicle-mounted communication system that carries out communications among a plurality of electrical components units in an automobile through a prescribed vehicle-mounted network, said system comprising:
  said plurality of electrical components units each having a processing part for performing drive control of a load associated with each of said plurality of electrical components units; and
  a plurality of connector devices with communication-controlling capability removably connected to said electrical components units, respectively, and connected to said vehicle-mounted network, said connector devices taking charge of controlling a communication system through said vehicle-mounted network.

2. The vehicle-mounted communication system according to claim 1, wherein
  each of said connector devices with communication-controlling capability includes
  a communication processing part taking charge of controlling a communication system through said vehicle-mounted network, and
  a rewritable non-volatile storage device storing a control program that stipulates control in said communication processing part.

3. A vehicle-mounted communication system that carries out communications among a plurality of electrical components units in an automobile through a prescribed vehicle-mounted network, said system comprising:
  said plurality of electrical components units; and
  a plurality of connector devices with communication-controlling capability removably connected to said electrical components units, respectively, and connected to said vehicle-mounted network, said connector devices taking charge of controlling a communication system through said vehicle-mounted network, wherein
  each of said connector devices with communication-controlling capability includes
  a communication Processing part taking charge of controlling a communication system through said vehicle-mounted network, and
  a rewritable non-volatile storage device storing a control program that stipulates control in said communication processing part, wherein
  each of said connector devices with communication-controlling capability is capable of being connected to a prescribed exclusive program rewrite device, and
  each of said connector devices with communication-controlling capability including, when supplied with a control program of a new communication system from said program rewrite device, a capability of rewriting said control program stored in said non-volatile storage device in said connector device with communication-controlling capability to said control program of said new communication system, and transmitting said control program of said new communication system to the other connector devices with communication-controlling capability through said vehicle-mounted network.

4. A connector device with communication-controlling capability that connects an electrical components unit in an automobile removably to a prescribed vehicle-mounted network,
  said connector device with communication-controlling capability taking charge of controlling a communication system through said vehicle-mounted network, wherein said electrical components unit has a processing part for performing drive control of a load associated with said electrical components unit.

5. The connector device with communication-controlling capability according to claim 4, comprising:
  a communication processing part taking charge of controlling a communication system through said vehicle-mounted network; and
  a rewritable non-volatile storage device storing a control program that stipulates control in said communication processing part.

6. A connector device with communication-controlling capability that connects an electrical components unit in an automobile removably to a prescribed vehicle-mounted network,
  said connector device with communication-controlling capability taking charge of controlling a communication system through said vehicle-mounted network,
  a communication processing part taking charge of controlling a communication system through said vehicle-mounted network; and
  a rewritable non-volatile storage device storing a control program that stipulates control in said communication processing part, wherein
  the connector device with communication-controlling capability is capable of being connected to a prescribed exclusive program rewrite device, and
  when supplied with a control program of a new communication system from said program rewrite device, said connector device with communication-controlling capability, is capable of:
  rewriting said control program stored in said non-volatile storage device in said connector device with communication-controlling capability to said control program of said new communication system, and transmitting said control program of said new communication system to the other connector devices with communication-controlling capability through said vehicle-mounted network, and
  rewriting said control program stored in said non-volatile storage device to said control program of said new communication system supplied from the other connector devices with communication-controlling capability through said vehicle-mounted network.

* * * * *